US006791488B2

(12) United States Patent
Diekhans et al.

(10) Patent No.: US 6,791,488 B2
(45) Date of Patent: Sep. 14, 2004

(54) METHOD AND APPARATUS FOR MEASURING GROUND HEIGHT

(75) Inventors: Norbert Diekhans, Gütersloh (DE);
Helmut Homburg, Harsewinkel (DE);
Jochen Huster, Gütersloh (DE);
Manfred Pollklas, Rheda-Wiedenbrück (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 0 days.

(21) Appl. No.: 10/404,169

(22) Filed: Apr. 1, 2003

(65) Prior Publication Data

US 2003/0184747 A1 Oct. 2, 2003

(30) Foreign Application Priority Data

Apr. 2, 2002 (DE) .......................................... 102 14 648

(51) Int. Cl.[7] .............................................. G01S 13/08
(52) U.S. Cl. ........................... 342/22; 342/118; 342/123
(58) Field of Search ........................... 342/22, 118, 123, 342/128, 120, 122

(56) References Cited

U.S. PATENT DOCUMENTS

| 4,620,192 | A | * | 10/1986 | Collins ........................ 342/128 |
| 6,029,431 | A | * | 2/2000 | Dowler et al. ............... 56/14.3 |
| 2002/0196179 | A1 | * | 12/2002 | Mattox ........................ 342/194 |
| 2003/0000193 | A1 | * | 1/2003 | Beck et al. .............. 56/10.2 E |

FOREIGN PATENT DOCUMENTS

| DE | 38 07 610 | | 9/1989 | |
| DE | 44 06 892 | | 9/1995 | |
| EP | 0260113 | * | 3/1988 | ........... G01S/15/14 |

* cited by examiner

*Primary Examiner*—Ian J. Lobo
(74) *Attorney, Agent, or Firm*—Husch & Eppenberger, LLC; Robert C. Haldiman

(57) ABSTRACT

A method and apparatus for determining the distance between an agricultural machine and a surface such as the ground, wherein at least one sensor contactlessly determines the distance between the sensor and the surface. The sensor uses electromagnetic waves to penetrate through the field vegetation. The sensor may be a radar, a microwave or a laser sensor. The electromagnetic wave is emitted in a vertical direction toward the ground and reflected back to the sensor. The determined distance is used for automatically maintaining a working height of a front attachment, such as a cutterbar.

22 Claims, 4 Drawing Sheets

METHOD AND APPARATUS FOR MEASURING GROUND HEIGHT

TECHNICAL FIELD OF THE INVENTION

The invention relates generally to self-propelled machines and, more particularly, to a method and apparatus for determining the distance between an agricultural machine and the ground.

DESCRIPTION OF THE RELATED ART

It is known that at least one mechanical ground probe can be mounted on a front attachment of an agricultural machine. This probe determines the distance of the front attachment from the surface of a field. A control device connected to its output controls the height of the front attachment above the field surface as a function of the distance sensed. Further, it is known, for example from DE 38 07 610 C2, that several ground probes can be arranged on the front attachment and distributed across the working width. The ground probes are spring-loaded and act mechanically on the standing crop or on the ground. The distance sensed by each probe is used by a control device for automatic height adjustment of the front attachment above the field or for automatic adjustment of the transverse tilt of the front attachment. The arrangement shown in DE 38 07 610 C2 allows only for limited penetration of field stubble or for the compaction of weeds. The penetration or compaction leads to improved distance measurement and, thus, fewer harvesting losses. Such results, however, are achieved only behind the finger bar of the cutterbar. The best performance of the mechanical ground probes is achieved only in a thin standing crop or in a weed-free area and between the individual rows.

A further drawback results from the mechanically limited measuring range of the ground probes. The ground probes cannot be used, for example, when harvesting seed because the probes have no contact with the ground when the front attachment is at the required working height. Further, such ground probes are subject to mechanical wear and damage. They must, therefore, be structurally elaborate for this purpose and be designed for turning and reversing.

It is further known, for example from DE 44 06 892 A1, that the distance between a front attachment and a field surface can be scanned contactlessly by ground distance sensors arranged on the front attachment. An ultrasound sensor scans, with reference to the propagation time of a transmitted and received wave pulse, the distance from the surface of the field to the height of the sensor. The use of an ultrasound sensor for this application has the drawback that, in case of dense ground cover or heavy weed invasion, the distance from the ground is not determined but instead the distance from the ground cover or weeds. The ultrasound wave transmitted is reflected directly on the nearest obstacle, and this is the distance sensed as the distance from the ground. This often results in establishing the front attachment at a setting too high above the ground. Incorrectly setting the height of the front attachment results in inefficiencies. For example, crop lying on the ground is no longer picked up by the front attachment or the crop is not completely harvested.

SUMMARY OF THE INVENTION

It is an aspect of the invention to provide a device which allows for contactless determination of the distance of the agricultural machine from the ground.

In another aspect of the invention, the distance between a front attachment and the ground is determined through the use of a sensor which penetrates vegetation.

In yet another aspect of the invention, the penetrating sensing means is used to automatically control the height or tilt of the front attachment.

The above aspects are achieved by the fact that associated with the agricultural machine is a sensor which contactlessly determines the distance from the ground by means of a electromagnetic wave, such as a radar or micro wave, penetrating through the field vegetation. The use of an electromagnetic wave of this kind allows reliable detection of the distance from the ground, as it penetrates through the field vegetation such as cereals, stubble, weeds or an under-sown crop.

The focused electromagnetic wave is oriented substantially vertically towards the ground, past the field vegetation. The approximately vertical orientation allows for scanning along the field vegetation to the ground with at little disturbance as possible by the vertically growing field vegetation, for example blades of grass or stubble. Due to focusing of the electromagnetic wave, the scanning area of the scanning beam is punctiform and needs only a minimum window to the ground in order to be able to scan it reliably. In particular, this scanning beam penetrates to the ground as low as possible past the field vegetation.

The sensor is arranged on the front attachment of the agricultural machine. This arrangement allows early detection of the distance from the ground. Further, the sensor can be designed with a lower measuring distance/scanning distance, so that the costs of the sensor are lower. A further advantage with this arrangement arises due to direct variation of the measured distance upon adjustment of the front attachment in position relative to the ground. The altered setting is detected directly by the sensor so that further sensors for detecting the position of the front attachment are unnecessary. Arranging the sensor on the front attachment instead of using ground probes produces, with a low working height, the same functionality of ground height imitation for the front attachment. However, with greater working heights, the difference is readily apparent. The sensors do not lose contact with the ground, and ground height imitation is achieved even with greater working heights. Also, without great expenditure, this arrangement affords the possibility of orienting the scanning beam of a laser sensor vertically or perpendicularly towards the ground.

The sensor provides a parameter used for automatic adjustment and/or control of the agricultural machine. Automatic control of the agricultural machine is possible by this means, and in particular the agricultural machine is automatically adjusted to the corresponding parameters already before harvesting the sensed field vegetation. This takes place contactlessly and without an additional sensor. Advantageously, harvesting can be carried out with optimized adjustment of the agricultural machine, or tracking can be improved.

In an alternative embodiment, a laser sensor is suitable as the sensor. This laser sensor scans the distance from the ground with a point laser beam by measurement of the propagation time, and advantageously also determines, due to the approximately vertical arrangement and the highly focused form of the laser beam past the field vegetation, the distance from the ground. The laser sensor is conveniently mounted to a divider of the front attachment. Due to the movement of the agricultural machine and the function of the divider, the field vegetation is scanned advantageously and new "windows" to the ground are traversed constantly, so that the ground can be detected continuously.

BRIEF DESCRIPTION OF THE DRAWINGS

Reference is now made to the drawings which illustrate the best presently known mode of carrying out the invention and wherein similar reference characters indicate the same parts throughout the views.

DETAILED DESCRIPTION

Figure 1:
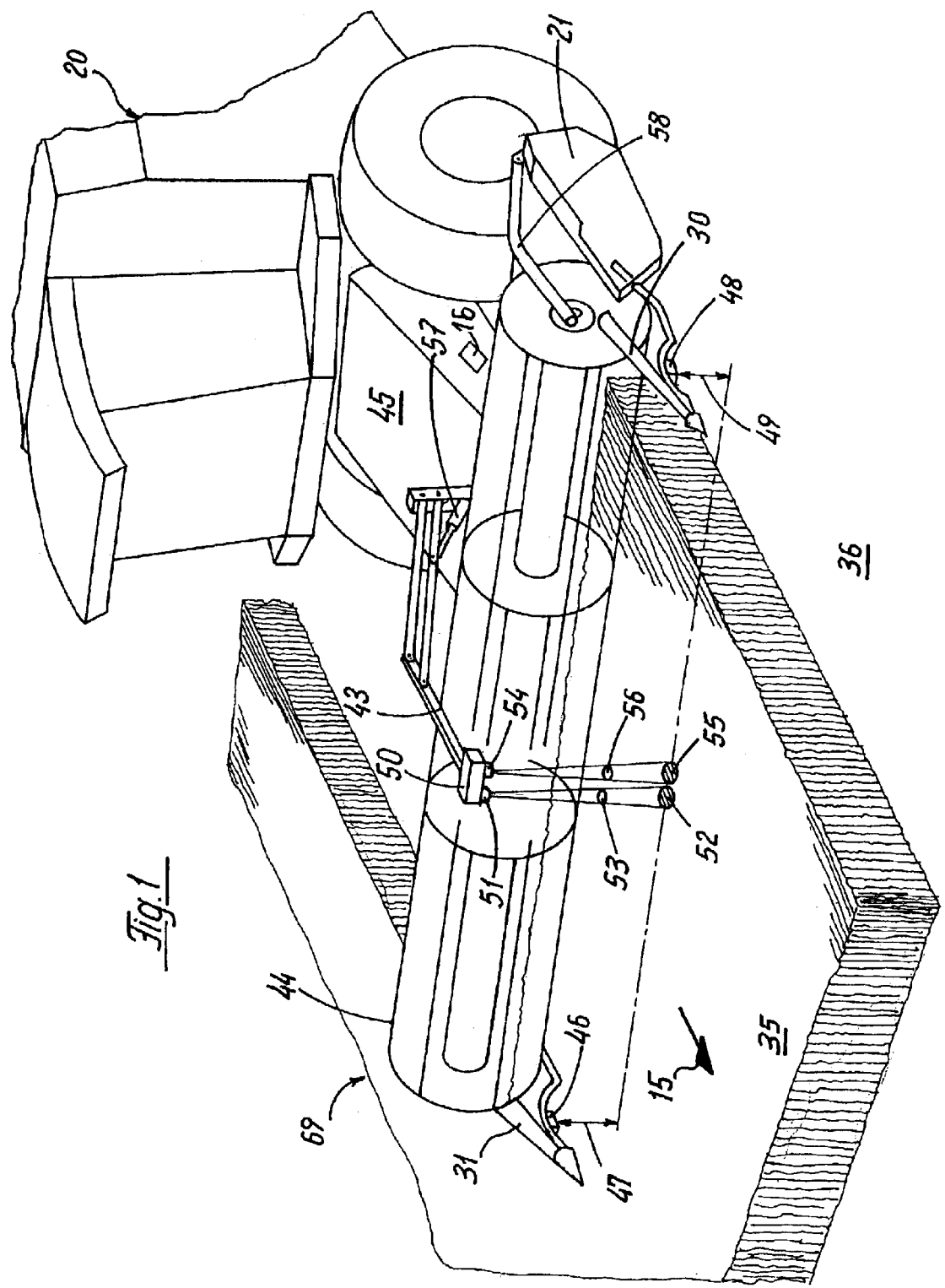
FIG. 1 is a perspective view illustrating the agricultural machine with several measuring devices.

FIG. 1 shows an agricultural machine 20 having a front and a rear. For example, the agricultural machine 20 may be a combine harvester for harvesting a crop 69. The agricultural machine 20 has a direction of travel 15 and travels across a ground surface 36. The agricultural machine 20 includes a feeder housing 45 and a cutterbar 21, such as a cereal cutterbar. While in the depicted embodiment a cutterbar is shown, other forms of front attachments could equally be used. The cutterbar 21 is carried by the feeder housing 45 and can be height adjusted relative to the ground 36. The cutterbar 21 can also be tilted transversely. On the cutterbar 21 is arranged a reel 44. The reel 44 can be varied in height for adaptation to different crops and to different standing heights relative to the cutterbar 21. For this purpose, the reel 44 is operatively connected to reel support arms 58 which are constructed and arranged to be movable. Several measuring devices 46, 48, and 50 are arranged at the front of the agricultural machine 20. The measuring devices 46, 48, and 50 contactlessly scan the distance to the ground 36 at several locations and allow early detection of changes in the height profile of the ground 36. Early detection allows for a timely reaction to adjust and control the height of the cutterbar 21. In this manner, the cutterbar 21 mimics the contours of the ground 36.

In a first embodiment, the measuring devices 46, 48, and 50 emit an electromagnetic wave. The electromagnetic waves emitted by the measuring devices 46, 48, and 50 penetrate through a field vegetation 35 over long distances and are reliably reflected by the surface of the ground. By knowing the location and orientation of each measuring device on the agricultural machine 20, the distance to the ground 36 from the particular measuring device can easily be calculated from the reflected signal of the electromagnetic wave. By a contactlessly operating sensor, it is advantageously possible to determine the distance to the ground ahead in the direction of travel of the agricultural machine. Contactless sensors avoid the wear due to ground contact normally found in pick-up elements, such as fingers or tines as well as finger bars and ground parts.

In the depicted embodiment, the distance to the ground 36 is determined at several locations transversely to the direction of travel 15 of the agricultural machine 20. Advantageously, the measuring devices 46, 48, and 50 scan the ground 36 in a particular area and advantageously deliver information on the contour and, in particular, the inclination of the ground in relation to the agricultural machine 20. Further, the plurality of distance values resulting from each scan can be assessed in relation to each other, and so erroneous measurements in tracks, holes, or on mounds can be avoided. While the depicted embodiment shows three sensors 46, 48, and 50, the determination of several distance values from the ground 36 can be achieved by one moving scanning beam, a single moving sensor, or by several sensors. The distance values can be used to locate and control a working edge of the agricultural machine 20. In this manner, the working edge can track the ground contour, thereby lessening crop losses.

On the cutterbar 21, halfway along the working width, the measuring device 50 is a radar sensor arranged so as to be movable in height on a holding arm 43 above the field 35, such as a cereal field. The height of the radar sensor 50 can be adjusted by a lifting cylinder 57 and effected in conjunction with height adjustment of the reel 44. It is thus possible to only slightly hinder the view of the operator of the agricultural machine 20 and to orient the radar sensor 50 as close as possible to the standing crop surface. The radar sensor 50 contains two horn aerials 51 and 54. Each horn aerial 51, 54 focuses an electromagnetic wave and directs it towards the ground 36 of the field 69. The transmitted signals of the radar sensor 50 penetrate through the field vegetation or standing crop 35 and are reflected at the surface of the ground 36. For determination of a distance signal, the so-called continuous wave (CW) radar sensor is particularly suitable as the radar sensor 50. This operates with electromagnetic waves in the microwave range with an internationally cleared frequency, say 24 Giga Hertz (GHz) for example. It also turned out in tests that the use of this frequency is particularly suitable for penetrating field vegetation 35 occurring in agriculture. Radar signals with other frequencies can also be used, the use of higher frequencies being reflected more by the field vegetation 35 and the lower frequencies being reflected less. Therefore, the lower frequencies are more effective.

In the depicted embodiment, the measuring device 50 is arranged above the field vegetation or unharvested field 35 and at the front, or forward of, the agricultural machine 20. This arrangement allows for scanning of the surface 36 and the standing unharvested field 35. As a result, early detection of changes in the ground profile before harvesting or picking up crop is advantageously possible through the field vegetation or past it. Automatic ground imitation of the front attachment can be regulated straight ahead as a result. Advantageously, the arrangement also provides for scanning with as short as possible scanning distance. Further, substantially vertical or perpendicular determination of the distance from the ground ahead is possible, so that easy evaluation and direct use of the distance values for ground height imitation and for tracking are made possible.

By various modulations of the transmitted signal of the radar sensor 50, the radar sensor 50 can be adapted to the respective application. For distance measurement, sinusoidal frequency modulation (SFM) or linear frequency modulation (LFM) of the carrier frequency is particularly suitable. A radar signal transmitted by the SFM method can be used to determine the distance from a target, whereas a radar signal transmitted by the LFM method allows for determination of several distances from several targets. SFM allows for easy evaluation of the reflected signal in comparison to the transmitted signal with the aid of amplitude and phase position evaluation. As a result, simple, cheap hardware equipment or software can be used. LFM advantageously allows for determination of several distance values from a received signal through the use of only one radar sensor. To determine the distance from several targets, the radar sensor 50 in the depicted embodiment is equipped with Fast Fourier Transform (FFT) evaluation software and corresponding hardware with a digital signal processor (DSP). The respective distance from a target is determined from the received signal with the aid of frequency analysis.

In some embodiments, the radar sensor 50 operates by the LFM method and from the received signal determines the distance from a first "ground" detection region 52 and from a further "surface" detection region 53. In this manner, height data for can be derived for several objects within the sensed field area. For example, the height of the field vegetation, a swathe height lying on the field, or the stubble height can be determined. With the aid of these measured values, the agricultural machine 20, and in particular the cutterbar 21, can be adjusted automatically. More specifically, the position of the finger bar and reel 44 can be automatically adapted to the standing crop 35 and to the desired stubble height.

Further, evaluation of the noise signal from the reflected or received signal between the two detection regions 52, 53 is possible. This noise signal contains information on the characteristics, such as density or moisture, of the standing cereal crop 35. These characteristics can advantageously be determined from the received signal, in particular from the noise signal which arises due to transmission of light through the field vegetation 35. The radar sensor 50 can evaluate this information and store the evaluation as a parameter. When scanning the ground ahead of the agricultural machine 20, the parameter may be made available and utilized before the crop 25 is harvested. The parameter can be presented to an operator of the agricultural machine 20 or used to automatically adjust and/or control the agricultural machine 20. Mapping of the height of the standing crop height, the standing crop density, and the moisture in conjunction with a navigated position on the field 69, delivers a corresponding map with location-related information, and enables subsequent assessment and use of this information to control and adjust the agricultural machine 20.

The radar sensor 50 is equipped with a further horn aerial 54 and determines the distance from further detection regions 55 and 56, wherein the horn aerial 54 is arranged on the radar sensor 50 with such an orientation that the detection regions 55 and 56 occur respectively adjacent to the detection regions 52 and 53. Double, adjacent detection of the standing crop 35 and ground allows for improved detection of the respective distance and further information on the field 35. As a result, erroneous measurements due to driving tracks can be eliminated, and a statement on the height profile of the ground and crop surface can also be derived transversely to the direction of travel 15.

Determination of the distance from the ground through the field 35 is also possible using the SFM method. The distance value is determined by simple evaluation of the received signal in conjunction with the transmitted signal with the aid of amplitude and phase position evaluation. Compared with the radar sensor 50 which operate by the LFM method, SFM sensors are simpler and cheaper. The arrangement of two horn aerials 51 and 54 on the radar sensor 50 further allows, in conjunction with use of the SFM method, measurement of the distance from the ground with a first horn aerial 51 and from the surface of the field 35 by a further horn aerial 54. Simply fitting the radar sensor 50 with only one horn aerial 51 or 54 is also conceivable and allows at least measurement of the distance to the ground 36. Further, a special combination of a radar sensor 50 for ground detection and laser sensors 46, 48 for surface detection instead of the radar sensor 50 shown is possible.

In the depicted embodiment, the measuring devices 46, 48 are each located on a divider 30, 31 of the front attachment. This mounting conveniently provides for protected mounting of the sensor close to and above the ground 36. The mounting also permits easy determination of the distance to the ground. Advantageously, the manufacturing costs are reduced by this mounting point and the shorter scanning distance that can be obtained therewith. The mounting location is particularly advantageous for a laser sensor because the field vegetation is forced apart by the divider, thereby improving the view to the ground. Direction of the focused electromagnetic wave past the field vegetation is additionally improved by this means, and an approximately vertical orientation of the scanning beam is further enabled, at the same time scanning the ground ahead. Accordingly, on each of the dividers 30 and 31 of the cutterbar 21 is arranged a laser sensor 46 and 48. These determine the height of the cutterbar 21 above the ground with point scanning beams 47, 49 which are oriented approximately vertically towards the ground.

The distance values determined by the laser sensors 46, 48 are delivered to an evaluating unit 16 arranged on the feeder housing 45. This evaluating unit 16 determines from the distance values of the laser sensors 46, 48 the corresponding control signals for a further control device, not shown, in order to be able to guide the cutterbar 21 at a respective equal distance from the ground and moreover with a given nominal working height. The evaluating unit 16 may further be arranged on the cutterbar 21 itself or form part of a central control system of the agricultural machine 20. Further, the distance values determined by the radar sensor 50 can also be delivered to said evaluating unit 16 and used for ground imitation of the cutterbar 21 in particular in conjunction with the distance values of the laser sensors 46, 48. The measured distance to the ground is used for automatic control of the front attachment. As a result, reliable height setting of the front attachment is ensured. In this case, heavy undergrowth, for example, of weeds in a standing crop of cereal has no effect on the height setting, and a uniform stubble height is advantageously obtained.

The position of the laser sensor 46 is predetermined by its arrangement on the divider 31 within the field 35. Here, in the region of the field 35 divided by the divider 31, the laser sensor 46 determines the distance from any existing undergrowth in the field 35 and the distance to the ground. Due to the movement of the agricultural machine 20, the scanning beam 47 scans the distance from the ground along a line one behind the other in the direction of travel 15, producing a scanning action of the rigidly directed scanning beam 47.

In some embodiments, at least two measured distance values of a sensor are recorded in a memory, and the greatest distance value is defined or stored as the distance value from the ground. In particular, during movement of the agricultural machine 20 over the field 35, by this means distance values located one behind the other in the direction of travel are recorded, and so a comparison is possible with the aid of the stored values. Advantageously, at least two distance values measured transversely to the direction of travel 15 can also be selected according to the greatest distance value. Advantageously, a plurality of distance values of several sensors can also be stored in a memory and selected according to the greatest distance values or given selection criteria such as maximum or minimum values. The measured distance values are filed in a memory in, for example, the sensor or the evaluating unit 16. From the measured scanned values, a height profile can be produced in the direction of travel 15 by the evaluating unit. With the aid of the maximum distance values occurring in the height profile, these distance values are by definition defined as the distance values to the ground and then used for, among other things, height setting of the cutterbar 21. Further, in a sensor or in an evaluating unit, there may be a ring memory in which are stored the successively determined distance values of a sensor. The greatest distance value in the ring memory is then used to control the cutterbar 21 to mimic the ground profile.

The laser sensor 48 mounted in the left divider 30 does not differ from the function of the laser sensor 46 in the left divider 31, but, as shown in FIG. 1, is arranged outside the field 35 in the region of the stubble field. Depending on the working height of the divider 31, the scanning beam 49 then scans the distance from the stubble, the undergrowth or the ground.

Figure 2:
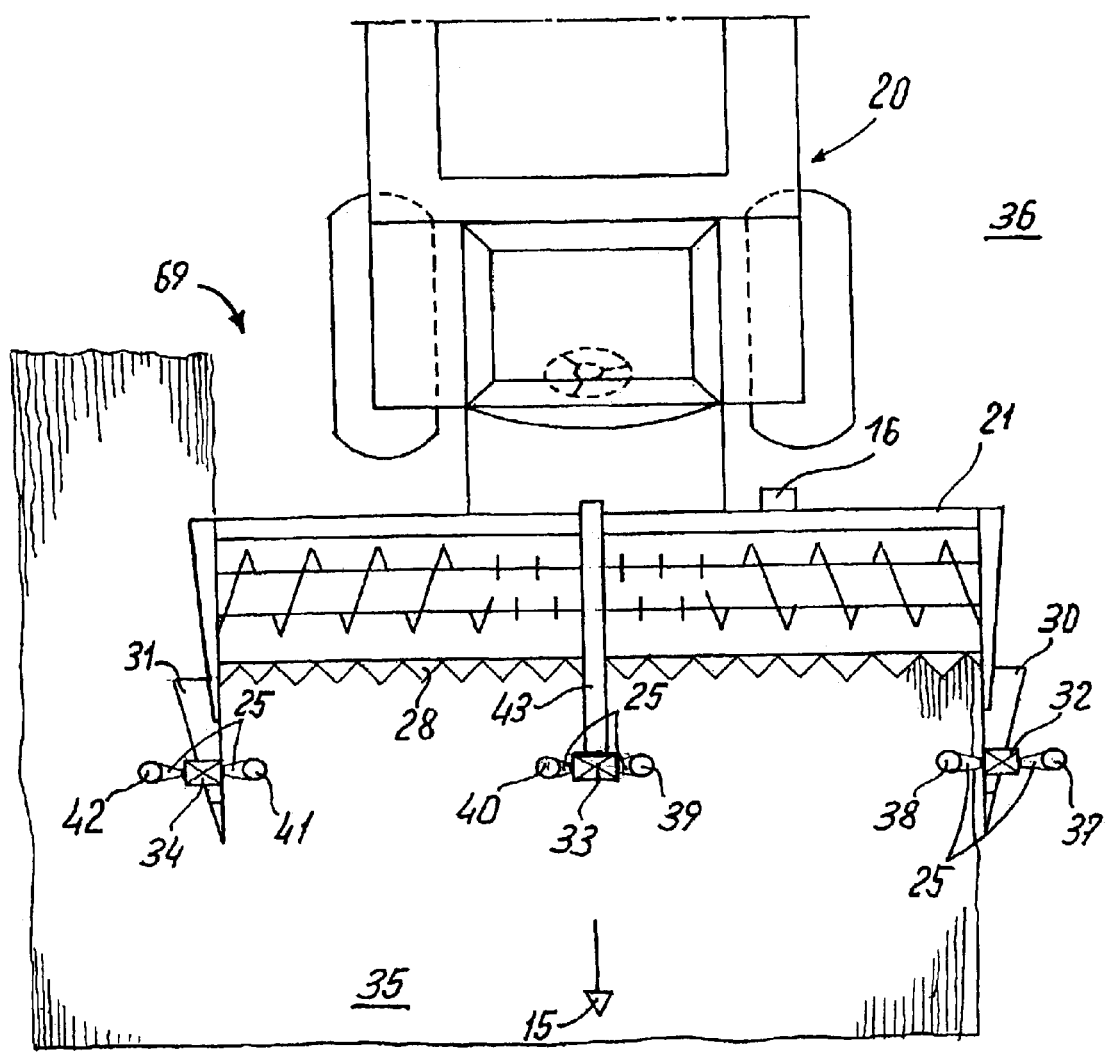
FIG. 2 is a front view of the agricultural machine with several measuring devices.

In FIG. 2, the agricultural machine 20 with several measuring devices 32, 33, 34 mounted thereon is shown in a top view. Seen in the direction of travel 15, these measuring devices 32, 33, 34 are designed as radar sensors with two aerials 51, 54 each and arranged in front of a finger bar 28. Generally, the radiation characteristic of the radar sensor 50 can be affected by the shape of the aerials 51, 54. In the depicted embodiment, the aerials 51,54 are horn-shaped each having an oval shaped opening so that approximately round scanning areas 37, 38, 39, 40, 41, 42 can be produced on the ground of the field 69. By this means, a reduction of the scanning areas 37, 38, 39, 40, 41, 42 is obtained. The received signal thus originates from an optimized small scanning area 37, 38, 39, 40, 41, 42, producing a received or reflected signal which is closely consolidated in time. The first radar sensor 32 is arranged on the left divider 30 of the cutterbar 21 and with a scanning signal 25 contactlessly scans the distance from the first scanning area 37 on the ground of the stubble field 35. On the second scanning area 38, the radar sensor 32 with the scanning signal 25 determines a further distance to the ground 36. On the holding arm 43 in the middle of the cutterbar 21 above the field 35 is arranged the second radar sensor 33. The second radar sensor 33 with the scanning signal 25 determines the distance from the third scanning area 39 and with the scanning signal 25 determines the distance from the fourth scanning area 40 in within the field 35. The third radar sensor 34 is mounted on the right divider 31 of the cutterbar 21. The third radar sensor 34 determines, at two locations spaced apart from each other transversely to the direction of travel 15, the distance to the ground in the field 35. With the scanning signal 25, the distance from the fifth and sixth scanning areas 41, 42 are determined.

The distance values determined by the radar sensors 32, 33, 34 are offset against each other to form a distance value. In the process, a mean distance value can be generated by averaging the two distance values, or, after corresponding evaluation, in each case only one of the two values can be selected for further use. The individual distance values can also be delivered to a common evaluating unit 16, evaluated accordingly and used to control ground imitation of the cutterbar 21. Thus, out of several distance signals, for example only two distance values may be selected by two sensors 32, 33, 34 and used for control of ground imitation of the cutterbar 21, and the other distance values are rejected as lying in a track or on a ground elevation. In particular, this selection is possible due to determination of a straight line which passes through all distance values with as low an error deviation as possible. The distance values which have the lowest error deviation from the given straight line are selected as relevant distance values and used for imitating the ground profile.

In another embodiment, the distance to the ground is determined by an oscillating scanning signal located at several positions on the agricultural machine 20. For example, the radar sensors 32, 33, 34 can be replaced by measuring devices with moving scanning signals, for example, a moving aerial 51, 54, or moving laser beams. This oscillating movement of the scanning signal advantageously yields a plurality of distance values within a short time and increases the probability of having scanned the distance to the ground with a narrow focus. From this plurality of measured values, the most probable measured value which corresponds to the distance from the ground can be selected. Alternatively, at least one distance value from one of the locations of the scanning areas 37, 38, 39, 40, 41, 42 shown can be used for tracking of the agricultural machine 20.

Figure 3:
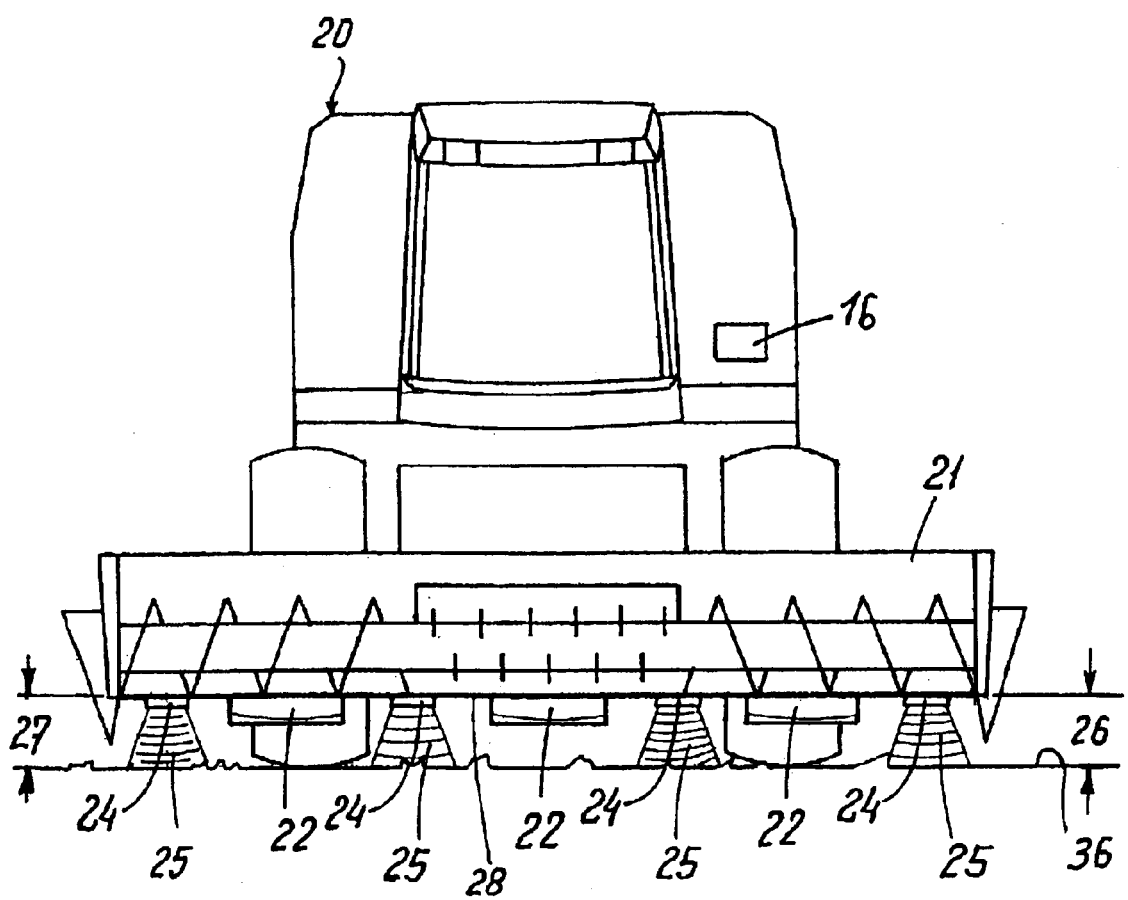
FIG. 3 is a front view illustrating the agricultural machine with measuring devices.

FIG. 3 shows the agricultural machine 20 in a front view with several measuring devices 24 arranged below the cutterbar 21. Multiple measuring devices improve the accuracy and the reliability of cutterbar 21 ground tracking. For height control or for transverse-tilt control of the cutterbar 21, across the full working width are distributed four measuring devices 24 which are designed as radar sensors 24 and which according to the invention determine the distance from the ground 23 by means of an electromagnetic wave. If the scanning signal sweeps across the whole working width of the front attachment, assessment of the shape of the ground profile ahead can be derived. Further, the size and shape of ground undulations, furrows, and obstacles can be detected and reacted to accordingly.

The radar sensors 24 are oriented in such a way that by means of the respective scanning signal 25 the vertical distance to the ground 23 can be determined. Each radar sensor 24 has a planar aerial and is arranged at an equal distance behind the finger bar 28 of the cutterbar 21 in the direction of travel 15. As a result, distributed across the working width, the distance from the ground to the cutterbar 21 can be determined, and the cutting height 26, 27 of the cutterbar 21 can be monitored by an evaluating unit 16, and corresponding control signals generated for ground imitation. In the depicted embodiment, the cutting heights 26, 27 are the same in the example shown and are regulated automatically according to a nominal height. While the cutting heights 26, 27 are depicted as having the same height, the cutting heights 26, 27 will not be identical when the cutterbar 21 is transversely tilted. If ground unevenness occurs, this is detected by at least one of the radar sensors 24 by a change of distance. Automatic regulation controls the height of the finger bar 28 above the ground 36 and the transverse tilt of the cutterbar 21. In this manner, the front attachment is guided parallel to the ground profile so as to avoid ground contact. Skids 22 are mounted underneath the cutterbar 21. The skids 22 protect the radar sensors 24 from damage, particularly when the cutterbar 21 is guided close to the ground 36. An arrangement of the radar sensors 24 behind the skids 22 is also possible and would further increase the protection from damage.

The four radar sensors 24 shown can each have a separate evaluating and control device for determining the distance, and transmit the measured distance value via known electrical connecting paths to a device for automatic ground imitation of the cutterbar 21. Furthermore, the electromagnetic wave used and corresponding modulation of the transmitted signal for the radar sensors 24 can be generated by a device and transmitted in multiplex mode to the individual aerials. Corresponding evaluation of the received signals can likewise be effected by an evaluating device for all the radar sensors 24. The respective received signal is delivered successively to an evaluating device by means of a high-speed switch (multiplexer), and the respective distance is determined accordingly by the evaluating device.

Instead of the radar sensors 24, laser sensors 46, 48 can be used, wherein the scanning signals 25 shown are then formed only by a rigid laser beam 47, 49. Further, the use of a laser scanner instead of a radar sensor 24 is possible. The scanning signal 25 then shows a scanning plane in which the point laser beam 47, 49 moves in oscillating fashion, which scans the distance from the ground 36 at several locations located transversely to the direction of travel 15. The greatest measured distance is defined as the distance value from the ground and used to control automatic ground imitation of the cutterbar 21.

Figure 4:
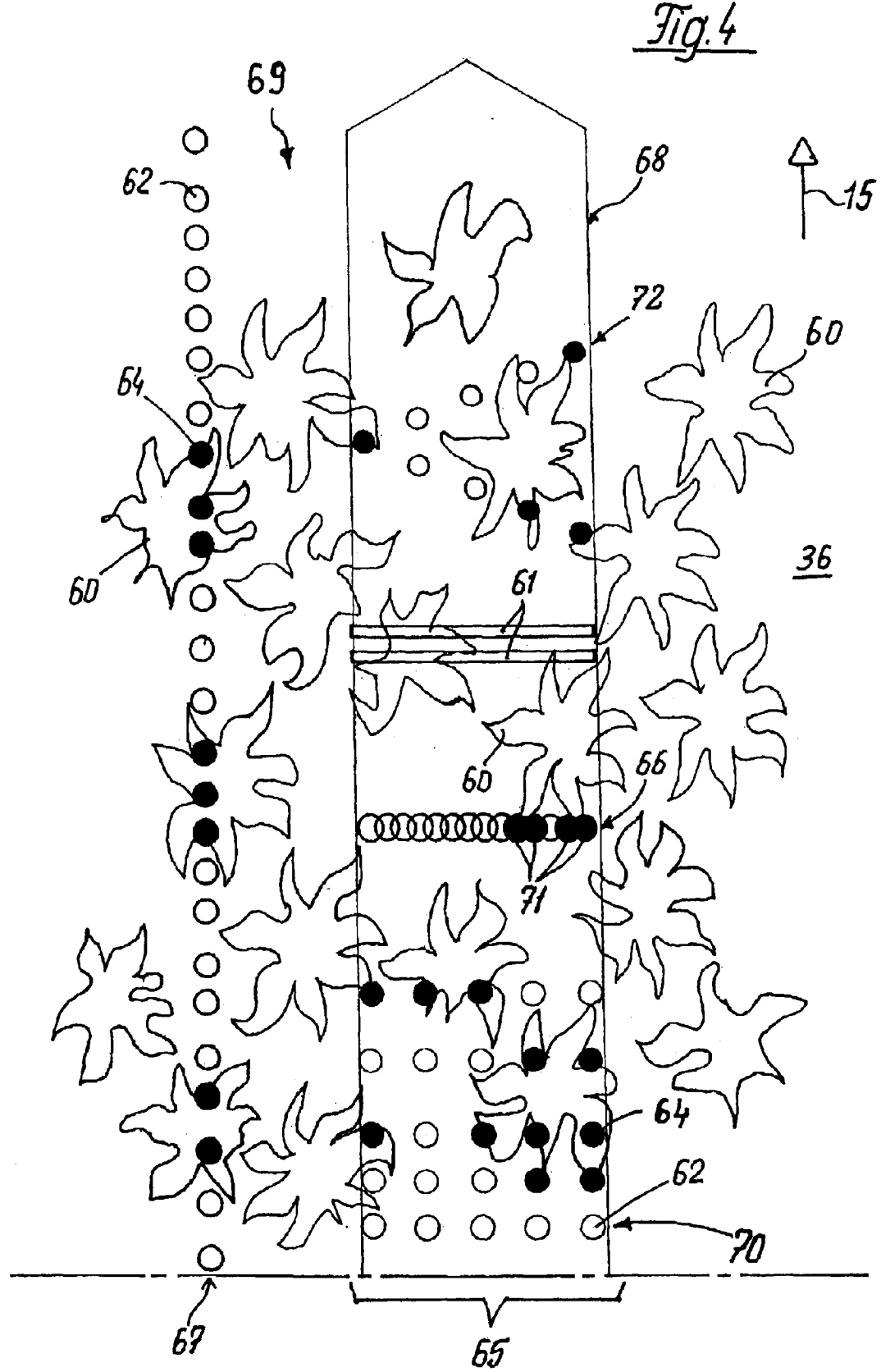
FIG. 4 is a top view of a field with plants illustrating different scanning methods.

FIG. 4 shows a top view of the field 69 with plants 60 distributed over it. These plants 60 constitute the field vegetation such as large-leaved plants or weeds. The plants 60 have grown untidily and distributed over the ground 36. Due to the movement of the agricultural machine 20 in the direction of travel 15, the height profile of the field 69 is scanned by means of the radar sensors 24, 32, 33, 34, 50 or the laser sensors 46, 48. The resolution is determined by the speed of travel of the agricultural machine 20, the scanning area, and the scan rate of the sensor 24, 32, 33, 46, 48, 50.

To illustrate the principle of measurement, this is described below with the aid of a laser sensor 46, 48, and further field vegetation such as blades of grass or stubble are omitted here. Scanning points 62, 64 of a point scanning beam 47, 49 oriented vertically towards the ground are shown by ordinary circular areas, wherein a distinction is made between the circular areas by circles shown as "far" scanning points 62 (ground) and by filled-in circular areas as "near" scanning points 64 (field vegetation). This definition is selected to illustrate the principle of measurement and serves to distinguish between the scanned values which are reflected by the ground 36 and those which are reflected by the plants 60. "Far" scanning points 62 are thus reflected by the ground 36, and "near" scanning points 64 by the plant 60.

The scanning row 67 shows the result of scanning the field 69 with a rigid scanning beam 47, 49 oriented in the direction of travel 15. The laser sensors 46, 48 are arranged, for example, in the divider 30, 31 of the cutterbar 21. The cutterbar 21 is moved over the field 69 in the direction of travel 15, carried by the agricultural machine 20, wherein the distance between the adjacent scanning points 62, 64 is determined by the speed of travel of the agricultural machine 20 and the scan rate of the laser sensors 46, 48. The laser sensor 46, 48 emits at a given rate focused electromagnetic waves in the form of light signals and, by means of the propagation time of the scanning beam 47, 49, determines the distance from a reflective object. In the example shown, the reflective object can be the plant 60 or the ground 36. If the scanning beam 47, 49 now at least partially encounters the plant 60, it is reflected to the laser sensor 46, 48, and the measured propagation time between transmitting and receiving the electromagnetic wave is detected as a "near" distance value 64. If no plant 60 is in the way of the laser beam, it is reflected on the ground 23, and a corresponding longer distance is detected as a "far" distance value 62. The laser sensor 46, 48 itself or a subsequent electronic evaluating unit assigns the measured distance values, for example, to a near or far characteristic respectively. The laser sensor 46, 48 itself or a subsequent electronic evaluating unit delivers only the distance values having a "far" character to a height or transverse-tilt control system for the cutterbar 21, in which case automatic ground imitation is performed with the aid of the measured distances.

In practical application, during the scanning described above there are sudden changes of distance between scanning the plant 60 at a distance from the ground, and the ground 36. These sudden changes of distance also arise when scanning mounds, stones and straw. As the ground profile does not usually exhibit such sudden changes, these sudden changes of distance can be used for selection of the distance values, and so distance values irrelevant to ground imitation can be filtered out. In particular, by scanning ahead in front of the cutterbar 21, the distance value can be recorded in a memory and the distance values occurring after a detected sudden change of distance can initially be observed. If the distance values determined after the sudden change of distance still occur (several distance values have approximately the same value), this is a sustained variation of ground profile, whereupon this value is detected as the distance value from the ground 23 and used to control ground imitation. If, however, the sudden change of distance is immediately followed by another sudden change of distance, then a visual obstruction or a depression in the ground was scanned by the scanning beam 47, 49 before, and this previously measured scanned value is rejected for use to control ground imitation.

To avoid scanning the height of tracks, depressions or holes in the field 69, several laser sensors 46, 48 can, as described above, be distributed across the working width of the cutterbar 21, and the distance values generated by the individual laser sensors 46, 48 can be assessed accordingly by an overriding evaluating unit 16 and delivered to the control system for ground imitation. Arrangement, in pairs for example, at a distance of one-half (0.5) m below the cutterbar 21 proved to be advantageous for this. The individual laser sensors 46, 48 then first evaluate, by the methods described, the distance values which indicate the distance from the ground 23, and then deliver them via known electrical means, for example via a CAN bus link, to the common evaluating unit 16. The evaluating unit 16 can of course also be part of the control system for ground imitation. Optimum adjustment of the cutterbar 21 to maintain a given working height across the whole working width is ensured as a result according to the invention.

FIG. 4 also shows further embodiments. These are practical examples in which at least one scanning beam 47, 49 of the laser sensors 46, 48, oriented approximately vertically towards the ground in the rest position, and moving in oscillating fashion about the rest position transversely to the direction of travel 15, repeatedly scan the ground 36 across the scanning width 65 of a scanning band 68. The individual practical examples shown differ in the respective scan rate of the laser sensors 46, 48. The laser sensors 46, 48 thus point-scan an area of the field 69. The oscillating scanning beams 47, 49 in conjunction with the movement of the agricultural machine 20 produce several scanning rows, similar to the scanning row 67, located one adjacent to the other arise in the scanning band 68. As a result, the probability of being able to determine the distance to the ground 36 past the plants 60 is further increased.

In a first row 70, distance values at five scanning points 62 are determined within the scanning width 65. Thus, the distance to the ground 36 is scanned five times. In the next row in the direction of travel 15, the ground 36 can be determined only with the aid of three of the five scanning points.

The row 66 shows a further example in which the scanning of distance values is carried out at a higher scan rate.

This can be seen by the plurality of scanning points 62, 64 within the scanning width 65. Blocked scanning points 71 contain parts of the plant 60 and therefore come under the "near" characteristic (field vegetation/plant).

Next is shown a further example with the aid of two scanning areas 61. Compared with the previous examples, the scan rate of the laser sensors 46, 48 has been increased such that scanning points are arranged close together and it is no longer possible to show individual points. The individual scanning beams 47, 49 which are reflected by the plant 60 within the scanning area 61 are detected as "near" scanning points and therefore make no contribution to control for ground imitation of the cutterbar 21. The scanning beams 47, 49 are also more focused, compared with the scanning beam 47, 49 shown in the previous examples, so that the scanning area 61 is narrower and the scanning beams 47, 49 have a higher probability of passing through a smaller window to the ground.

In another example, zigzag scanning 72 within the scanning band 68 is shown. This form of scanning arises due to an oscillating movement of the scanning beam 47, 49 with a lower frequency than in the examples 61, 66, 70 described and shown above, and a uniform speed of travel of the agricultural machine 20 over the field 69.

Evaluation of the individual measured distances at the scanning points 62, 64, 71 can be carried out within a period of time, the scanning width 65 or with the aid of a number of scanning points 62, 64, 71. The greatest distance value is selected from a sum of distance values and used at least for height control of the front attachment. Corresponding averaging over a number of measured distance values as well as comparison or assessment in conjunction with the distance value or values previously selected and used for ground imitation can further be carried out.

The scanning width 65 is a further variable parameter of the measuring device according to the invention. In particular, this parameter is varied in conjunction with the scanning distance in such a way that, with different scanning heights in each case within the scanning band 68 over an approximately equal scanning width 65 distance values are determined. The examples described and shown above can also be transferred to measuring devices which do not operate with laser beams.

The measuring devices 24, 32, 33, 34, 46, 48, 50 shown in the figures are shown arranged at different locations on the agricultural machine 20. Furthermore, different methods of evaluation for the scanning signals are employed. It is obvious to one skilled in the art that the invention can also be used on forage harvesters, and the examples given can be further embodied by different mountings, separate or combined methods of evaluation.

Use of the solutions proposed makes it possible on the one hand to freely select the position of the scanning point on the ground in relation to the agricultural machine, and on the other hand to freely adapt the mounting of the sensor on the agricultural machine to the equipment and its construction. The possible scanning distances and the measuring precision of the sensors used that can be obtained here are advantageously within the required ranges and surpass the known mechanical ground probes. As a result, for example, ground imitation of the front attachment is possible even when harvesting with greater cutting heights. Due to contactless scanning of the ground, a special structural design of the sensors is not required for turning or for reversing of the agricultural machine.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, while the front attachment is shown as a cutterbar, other forms of front attachments could equally be implemented Thus, the breadth and scope of the present invention should not be limited by any of the above-described exemplary embodiments, but should be defined only in accordance with the following claims appended hereto and their equivalents.

What is claimed is:

1. An apparatus for determining a distance between a front harvesting attachment of an agricultural machine and a surface, comprising:
   at least one electromagnetic wave sensor operatively mounting on the front harvesting attachment of the agricultural machine;
   said at least one electromagnetic wave sensor emiting a focused signal oriented in a substantially vertical direction, said signal being capable of penetrating vegetation; and
   said signal being reflected from the surface, and said at least one electromagnetic wave sensor receiving said reflected signal to contactlessly determine the distance between said front attachment and the surface.

2. The apparatus according to claim 1, wherein said at least one sensor emits a plurality of oscillating scanning signals, wherein each of said plurality of oscillating scanning signals is emitted from different point on said front harvesting attachment.

3. The apparatus according to claim 1, wherein focused substantially vertical emitted signal is transverse to a direction of travel of the agricultural machine.

4. The apparatus according to claim 1, wherein said front harvesting attachment includes a divider and said at least one sensor is operatively mounted on said divider.

5. The apparatus according to claim 1, wherein said at least one sensor is operatively arranged above an unharvested field and forward in a direction of travel of the agricultural machine.

6. The apparatus of claim 1, wherein said at least one electromagnetic wave sensors is a radar sensors.

7. The apparatus of claim 6, wherein said at least one radar sensor operates with a frequency of about 24 Giga Hertz.

8. The apparatus of claim 1, wherein said emitted signal is sinusoidally frequency modulated.

9. The apparatus of claim 1, wherein said emitted signal is linearly frequency modulated.

10. The apparatus of claim 1 further comprising at least one second sensor.

11. The apparatus of claim 10 wherein said first and second sensors are arranged transverse to a direction of travel of the agricultural machine.

12. The apparatus of claim 10 wherein a first of said wave sensors is mounted at a first lateral portion of the front attachment and said second sensor is mounted at an opposite lateral portion of the front attachment.

13. The apparatus of claim 1 wherein said sensor is disposed such that height may be measured at substantially all points across the width of the front attachment.

14. A method for contactlessly determining a distance between a front harvesting attachment of an agricultural machine and a surface comprising the steps of:

emitting at least two electromagnetic wave signals capable of penetrating field vegetation from sensors mounted on the front harvesting attachment;

reflecting said at least two emitted electromagnetic wave signals from the surface;

sensing said reflected at least two emitted electromagnetic wave signals; and determining a distance value for each of said at least two reflected electromagnetic wave signals; and storing in a memory the greatest distance value as the distance between the agricultural machine and the surface.

15. The method according to claim 14, the agricultural machine having a front and a rear, wherein said step of emitting at least two electromagnetic wave signal in performed at the front of the agricultural machine.

16. The method according to claim 14, the agricultural machine having a front attachment, further comprising the step of: automatically controlling a height of the front harvesting attachment based on said stored memory value of the distance between the agricultural machine and the surface.

17. The method according in claim 14, the agricultural machine having a direction of travel and including a tiltable front harvesting attachment, wherein said at least two emitted electromagnetic wave signals are spaced apart from each other and each emitted in a direction substantially transverse to the direction of travel of the agricultural machine, further comprising the step of: automatically controlling the tilt of the front attachment based on said distance value for at least one of said reflected electromagnetic wave signals.

18. The method according to claim 14, further comprising the step of: determining a crop height above the surface.

19. The method according to claim 14, further comprising the step of: tracking the agricultural machine.

20. A method for contactlessly determining a distance between a front harvesting attachment of an agricultural machine and a surface comprising the steps of:

emitting at least two electromagnetic wave signals capable of penetrating field vegetation;

reflecting said at least two emitted electromagnetic wave signals from the surface;

sensing said reflected at least two emitted electromagnetic wave signals; and determining a distance value for each of said at least two reflected electromagnetic wave signals; and storing in a memory the greatest distance value as the distance between the agricultural machine and the surface and determining at least one characteristic of the vegetation and storing said at least one characteristic as a parameter in said memory.

21. The method according to claim 20, wherein said at least one characteristic of the vegetation is selected from the group consisting of density and moisture.

22. The method according to claim 20, further comprising the step of: automatically controlling the agricultural machine based on said at least one characteristic.

* * * * *